Patented Aug. 28, 1951

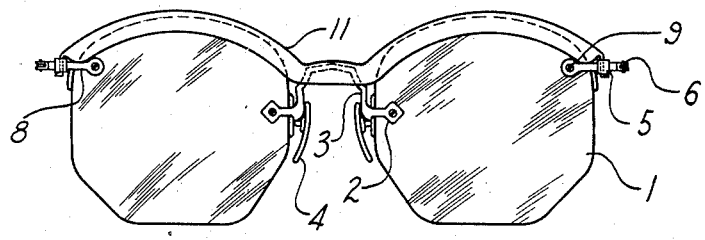
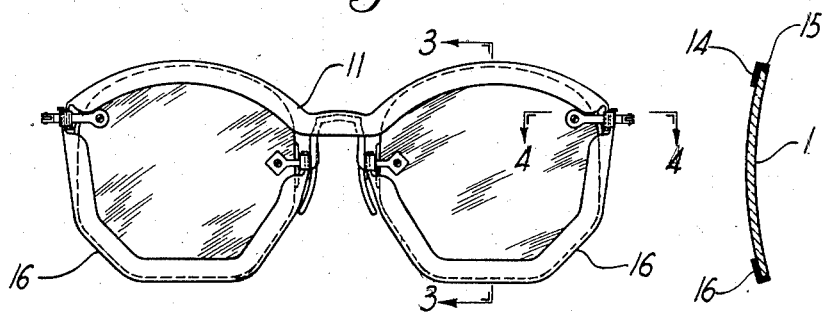
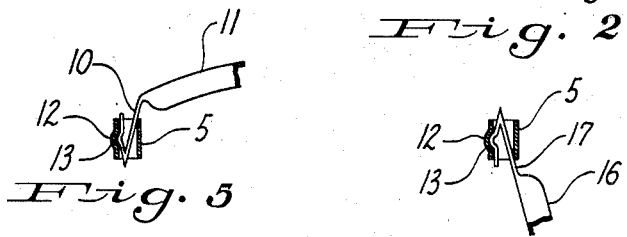
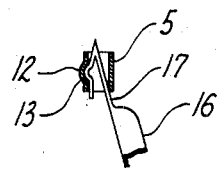
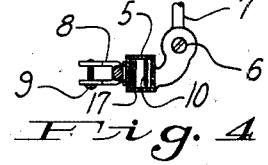
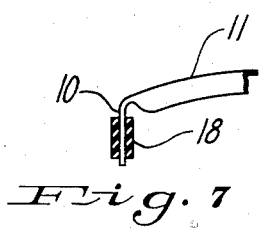
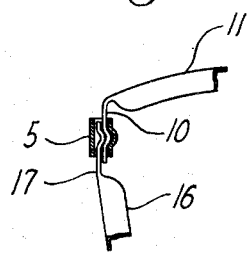
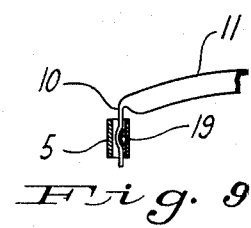
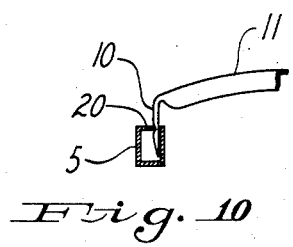

2,566,236

UNITED STATES PATENT OFFICE 2,566,236

ORNAMENTAL FRAME FOR EYEGLASSES

Samuel Meddoff, Ellwood City, Pa.

Application July 29, 1947, Serial No. 764,419

1 Claim. (Cl. 88—41)

This invention relates to new and useful improvements in ornamental eye-glasses, and it is among the objects thereof to provide detachable frames of varying color and finish for eyeglasses for wearers to match or harmonize with their ensembles.

Current eye-glasses have been improved in shapes and styles to make them more attractive to wear and to give the wearer greater cosmetic appeal, glamour, as always, being of paramount importance.

In accordance with the present invention, rimmed or unrimmed eye-glasses may be given various shape and color appeal by the attachment of ornamental frames either as a bridge across the top of the lenses convering the nose piece or as individual casings for the bottom of the lenses, or both, and it is among the objects of the present invention to provide such frames with detachable mountings whereby they may be interchanged or be arranged to suit the particular desire of the wearer.

These and other objects of the invention will become more apparent from a consideration of the accompanying drawing, constituting a part hereof, in which like reference characters designate like parts, and in which—

Fig. 1 is a front elevational view of eye-glasses with an ornamental bridge frame embodying the principles of this invention;

Fig. 2 a similar view with ornamental frames added to the bottom of the lenses;

Fig. 3 a vertical section taken along the line 3—3, Fig. 2;

Fig. 4 a cross-sectional view, partially in elevation, taken along the line 4—4, Fig. 2; and Figs. 5 to 10 inclusive, cross-sectional views of various forms of attaching means employed for attaching and securing the ornamental frames to the eye-glasses.

In the drawing the numeral 1 designates one of a pair of lenses attached by brackets 2 to a bridge 3 carrying nose pieces 4. The lenses are further provided with brackets 5 having hinges 6 to which are attached the conventional temple pieces 7, Fig. 4. As shown in Fig. 4, the bracket 5 has a bifurcated extension 8 for receiving the screw 9 that passes through the lens, and the bracket is of a box-shape arrangement for receiving the ends or prongs 10 of ornamental frames 11 which, as shown in Fig. 1, extend from end to end of the eye-glasses, bridging the nose piece 3. As shown in Fig. 5, the box-shape portion 5 of the bracket is provided with an indent 12, and the prong 10 is a folded member having a similar indent 13 that interacts with the indent 12 to snap the frame 11 in position.

The frame 11, as shown in Fig. 3, has a front portion designated by the numeral 14 and a flange portion 15 which engages the upper edge of the lens for a portion thereof to lend support to the frame which bears on the lens. In Fig. 2 the ornamental frame 11 is supplemented by bottom frame portions 16 which are shaped to the outline of the lens or may be shaped differently than the lens and are likewise provided with attaching prongs 17, Fig. 6, which interact with the box-shape bracket 5 with the same indentations 12 and 13 as shown in Fig. 5. The construction of Fig. 6 illustrates the manner of mounting the bottom pieces where no top frame is used. However, Fig. 8 shows an arrangement where both a top frame 11 and bottom frame 16 are employed with their prongs 10 and 17 interacting by indentations with the bracket 5 and with each other.

Fig. 7 illustrates the setting of the frame 11 with its prongs 10 in a rubber setting 18 that fits into the square slot of bracket 5. Fig. 9 illustrates a ball type interaction of the prong 10 with a ball type lug 19 on the frame 5.

In Fig. 10 the prong 10 of the frame 11 is provided with a recess 20 that extends in a slot of the frame 5 to snap in position when mounted on the lenses.

By means of the above described lens and frame structures, the ornamental frames may be readily removed and snapped into position to allow a range of colors in eye-glasses. Both the nose pieces and temple pieces are fastened to the lenses and the attachment of the ornamental frame does not interfere with the conventional construction of eye-glasses with the exception of the attaching means as described.

Plastic or metal ornamental frames may be employed of any desirable coloring or ornamentation, the most suitable being a very thin gage metal colored electrolytically to any desired color or pastel shade with the same permanency as copper plating. The degree of finish from shiny to dull may also be controlled.

Although various modifications of the invention have been herein illustrated and described, it will be evident to those skilled in the art that further modifications may be made in the details of construction without departing from the principles herein set forth.

I claim:

In an eye-glass having a pair of spaced lenses, a bridge interconnecting said lenses, temple pieces attached to the ends of the lenses, hinge brackets for said temple pieces having vertically aligned sockets, an ornamental frame enveloping a portion of the outer edge and face of the lenses and having attaching means comprising flexible members adapted to be snapped into the sockets of said hinge brackets, the ornamental frame being L-shaped in cross section with the long leg overlapping the lenses and conforming to the contour of the lenses throughout its length, said ornamental frame constituting a spring structure when mounted on the lenses for maintaining tension on the attaching means, said sockets and said flexible members having interlocking portions.

SAMUEL MEDDOFF.

REFERENCES CITED

The following references are of record in the file of this patent:

UNITED STATES PATENTS

| Number | Name | Date |
|---|---|---|
| 1,710,245 | Schryer | Apr. 23, 1929 |
| 1,744,993 | Tamplin | Jan. 28, 1930 |
| 2,284,630 | Banks | June 2, 1942 |
| 2,357,267 | Rohrbach | Aug. 29, 1944 |
| 2,393,837 | Swanson | Jan. 29, 1946 |
| 2,444,498 | Cochran | July 6, 1948 |

FOREIGN PATENTS

| Number | Country | Date |
|---|---|---|
| 67,169 | Germany | Aug. 7, 1892 |
| 557,743 | France | May 9, 1923 |
| 466,034 | Great Britain | May 20, 1937 |